United States Patent [19]
Schoenzeit et al.

[11] Patent Number: 5,615,314
[45] Date of Patent: Mar. 25, 1997

[54] INTERFACE FOR PROVIDING RASTERIZED DATA TO AN IMAGING DEVICE

[75] Inventors: Loren Schoenzeit, Orono; Richard A. Keeney, Eagan; William H. Glass, Edina; Scott T. Mazar, Inver Grove Heights, all of Minn.

[73] Assignee: Management Graphics, Inc., Minneapolis, Minn.

[21] Appl. No.: 298,410

[22] Filed: Aug. 30, 1994

[51] Int. Cl.⁶ .................................................. G06K 1/00
[52] U.S. Cl. ........................................ 395/114; 395/101
[58] Field of Search ..................................... 395/101, 109, 395/115, 118, 133, 162, 100, 106, 114, 113, 375, 725; 358/451, 261.1, 428; 382/298, 233, 234, 239, 303, 339; 355/86

[56] References Cited

U.S. PATENT DOCUMENTS

| | | | |
|---|---|---|---|
| 4,951,228 | 8/1990 | Hirawa et al. | 395/133 |
| 5,097,518 | 3/1992 | Scott et al. | 382/298 |
| 5,113,494 | 5/1992 | Menendez et al. | 395/163 |
| 5,218,431 | 6/1993 | Gleicher et al. | 348/472 |
| 5,252,819 | 10/1993 | Norsworthy | 250/208.2 |
| 5,333,064 | 7/1994 | Seidnet et al. | 358/451 |
| 5,333,211 | 7/1994 | Kanda et al. | 382/261 |
| 5,479,587 | 12/1995 | Campbell et al. | 395/116 |

*Primary Examiner*—Edward L. Coles, Sr.
*Assistant Examiner*—Gabriel I. Garcia
*Attorney, Agent, or Firm*—Barry R. Lipsitz; Ralph F. Hoppin

[57] ABSTRACT

An interface provides rasterized data to an imaging device such as a color copier or laser printer. Rasterized image data received from a raster image processor is compressed and stored in an output queue until the imaging device is ready to receive an image represented by the data. A data output path between the output queue and imaging device communicates the rasterized image data to the imaging device. The compressed rasterized image data is decompressed within the data output path as the data is being communicated to the imaging device. Throughput of the imaging device is maximized by actuating the device to operate in a multiple copy mode while rasterized image data for different image pages is successively communicated to the imaging device. An abort command prevents the imaging device from processing extraneous substrates when running in a multiple copy mode. Image processing is provided to selectively dilate objects contained in images represented by the rasterized image data, thereby compensating for potential multi-pass misregistration errors in the imaging device.

24 Claims, 5 Drawing Sheets

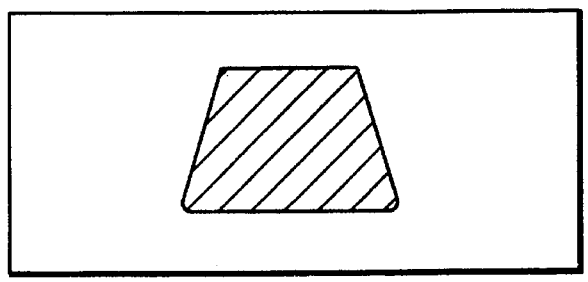
FIG. 6 — DESIRED IMAGE 80
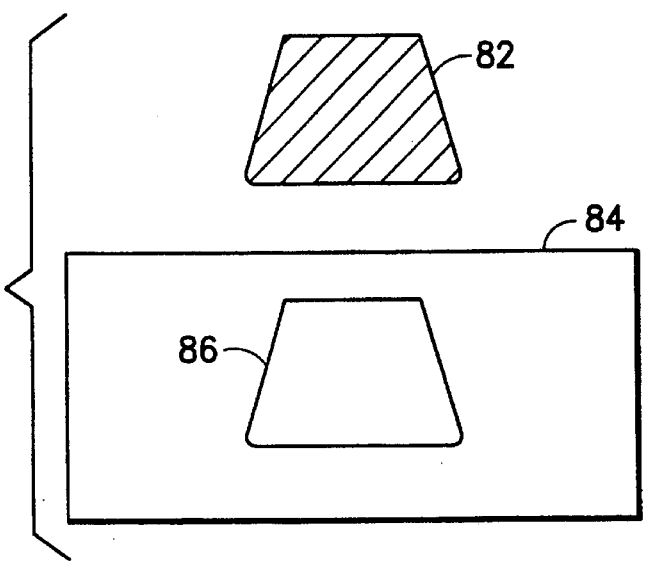
FIG. 7 — COLOR A / COLOR B
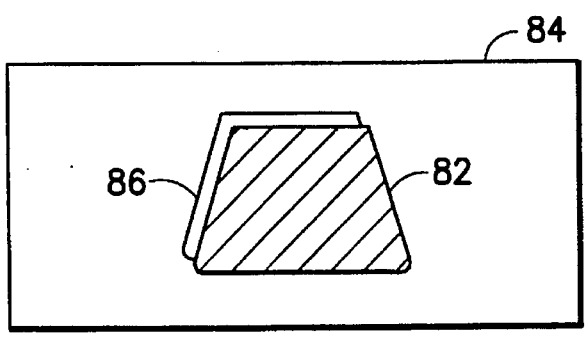
FIG. 8 — MISREGISTERED IMAGE
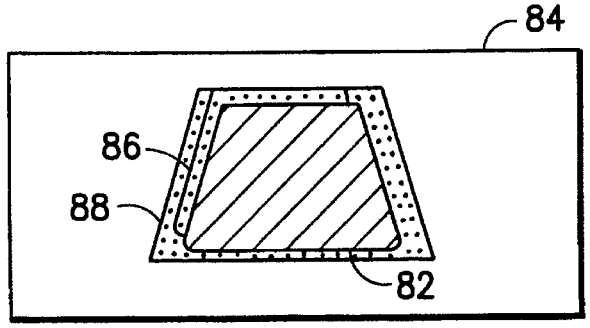
FIG. 9 — CORRECTED IMAGE

INTERFACE FOR PROVIDING RASTERIZED DATA TO AN IMAGING DEVICE

BACKGROUND OF THE INVENTION

The present invention relates to the communication of graphic image files to an imaging device such as a color copier, laser printer, image recorder or the like, and more particularly to an interface for processing and forwarding rasterized image data to the imaging device in an efficient and orderly manner.

In computer generated image recording, a plurality of computer generated images are rasterized for input to a color copier, laser printer or the like or for exposing corresponding frames of photographic film or another imaging substrate. The copier, printer or film recorder (referred to herein as an "imaging device" or "output device") processes the rasterized image data to provide, e.g., paper copies, transparencies, color slides or motion picture footage containing images represented by the image data.

To obtain the computer generated images, a user first generates a graphic image file using a computer graphics program. The graphic image file may include one or more images or frames of image data which, for example, are in a bit mapped or text (e.g., ASCII) format. The image data are processed by a raster image processor (RIP) which provides frames of raster image data for use by an output device in generating images. The output device may comprise, for example, a color copier, a laser printer, or a photographic film recorder. Film recorders, such as those sold under the Solitaire® and Sapphire® trademarks by Management Graphics, Inc. of Minneapolis, Minn., USA are well known in the art. Color copiers, such as those manufactured by Xerox Corporation and laser printers, such as those manufactured by Hewlett-Packard Corporation are also well known.

In the past, during use of such an image generation and recording system, the RIP would send one page or frame of image data at a time to an output device that would then generate the image. This resulted in inefficient use of the output device, as the processing time associated with generating an image by the output device remained relatively constant while the time required to produce a page or frame of raster image data varied with the complexity of the image. It would not be unusual for the output device to spend considerable time in an idle mode when complex images were being processed by the RIP. At other times, the RIP would be idle because the output device was already busy. There was no way to minimize the idle periods and keep both the RIP and output devices as busy as possible.

In systems where many computers communicate over a network, a plurality of different users may compete for the use of a graphic output device. Because of the extensive processing time often required to generate raster image data, inefficient use of the output devices available via the network sometimes results in an unacceptable response time for one or more of the various users. Further, to process different graphic image files for different output devices and end user requirements, a plurality of different RIP modules may be needed for generating raster image data. Examples of different available RIP modules include those known as "PostScript," "Targa," and "TIFF."

A system for managing the processing of graphic image data by different RIPs and different output devices is disclosed in commonly assigned, copending U.S. patent application Ser. No. 08/246,795 filed on May 20, 1994, entitled "Apparatus for Managing Rasterization of Graphic Image Files" and incorporated herein by reference. The system disclosed therein minimizes the amount of time that the RIPs and output devices are idle, and keeps these devices as busy as possible. The system also enables different graphic image files to be processed by the same or different RIPs and routed to the same or different output devices in an orderly and efficient manner. Multiple instances of the same RIP, implemented by a RIP software module, can be run in parallel to concurrently process different graphic image files for the same or different output devices.

A problem not specifically addressed by the prior system is that some output devices cannot immediately start generating output when the graphic image server is ready to send the rasterized image data. For example, imaging devices such as color copiers and laser printers have a startup delay (i.e., a delayed "first copy out" time) even when warmed up. This delay is necessary to allow mechanical parts to be brought up to speed and to enable certain preliminary processes to occur, such as adjusting lenses, cleaning a photoreceptive drum, or agitating developer and toner to develop a sufficient triboelectric charge. In addition, devices such as color copiers may only be able to start a first copy at a specific point in a mechanical cycle, and it is necessary to wait for the parts to reach the proper point before commencing imaging of the first page of a copying run. If the imaging device finishes one page before the next is ready for printing, the device will revert to an idle state, and the delayed first copy out sequence will have to be repeated for the next image. Such delays will occur if the imaging device has to wait to receive the next image from the graphic image server, which may often be the case. The processing of a single page at a time by a photocopier or other imaging device can significantly reduce the production rate of multiple image files, e.g., on the order of a 50% reduction from the maximum possible throughput. In order to manage the flow of rasterized image data to an imaging device, an output queue or buffer may be used to hold a plurality of rasterized image files. These files can be output to the imaging device on an as needed basis, to keep the imaging device running (as opposed to idling) as much as possible. However, a substantial amount of storage space (e.g., hard disk and/or random access memory) is required to store a plurality of rasterized image files for subsequent output to an imaging device. A full 8.5"×11" cyan-yellow-magenta-black (CYMK) color image page consumes about sixty-four megabytes (MB) of memory as a bitmap. Currently, such memory is relatively expensive and it is desirable to minimize its use.

A further problem with known image processing systems is that mechanical misregistration in the output device can cause gaps to occur at the transitions between different colors in the image. Color copiers, for example, generally require four (CMYK) different color passes to form a complete image. Photographic processors generally require three (red-green-blue) passes. If the colors are not laid down in perfect registration, unsightly gaps may occur at the edges of the image objects. In the past, efforts have been directed at resolving this problem by providing fixes in the output device itself, and the quality of the final image was restricted to the limitations of the output device with no way to improve thereon.

It would be advantageous to provide an interface between an image generation system and an image output device that overcomes the problems noted above. Specifically, such an interface should enable rasterized image data to be forwarded to the output device in such a manner that the idle time of the output device is kept to a minimum. Further, the memory requirements for buffering the data before it is sent to the output device should be minimized. In addition, processing of the raster image data prior to forwarding it to the output device should be provided in order to enhance the quality of the final printed image.

The present invention provides an interface for use between a graphic image server and an imaging device having the aforementioned and other advantages.

SUMMARY OF THE INVENTION

In accordance with the present invention, an interface is provided for forwarding rasterized data to an imaging device. An input receives the rasterized image data from a raster image processor. Means are provided for compressing the received rasterized image data. An output queue holds the compressed rasterized image data until the imaging device is ready to receive and process an image represented by the data. A data output path is coupled between the output queue and the imaging device for communicating the rasterized image data to the imaging device. Means are provided within the data output path for decompressing the compressed rasterized image data as it is being communicated to the imaging device. Preferably, the compression means use a lossless compression scheme such as run length coding to compress the rasterized image data.

In an illustrated embodiment, the rasterized image data received from the raster image processor is representative of a plurality of different images to be provided on separate substrates by the imaging device. The interface further comprises means for issuing control signals to the imaging device. The control signals can comprise, for example, a multiple copy command instructing the imaging device (e.g., a color copier) to continue preparing additional substrates (e.g., paper or transparencies) for imaging after a first substrate has been prepared for imaging. An abort command instructs the imaging device to stop preparing additional substrates for imaging. In this manner, successive substrates prepared for imaging by the imaging device in response to the multiple copy command are imaged with successive images represented by the rasterized image data at the maximum possible throughput rate.

The means for issuing control signals can be responsive to the output queue for issuing the abort command when the level of compressed rasterized image data in the output queue has been depleted to a predetermined point. The predetermined point can occur, for example, when the output queue is empty. In an alternative illustrated embodiment, the predetermined point occurs when the output queue has been depleted to the member of images for which the imaging device will continue to prepare additional substrates after receiving the abort command and before coming to rest. The means for issuing control signals can also be responsive to the imaging device for delaying the issuance of the abort command until the imaging device has commenced preparation of a final substrate necessary for an imaging job. For example, where the imaging device is a color copier, the interface can wait for a signal from the copier indicating that it has commenced the feeding of the next sheet of paper, before the abort command is issued. The abort command will then prevent the copier from feeding any additional sheets of paper.

The interface of the invention can further comprise an image processor coupled to receive the rasterized image data prior to communication of the rasterized data to the imaging device. The image processor selectively enlarges objects contained in images represented by the rasterized image data to compensate for potential multi-pass misregistration errors in the imaging device. The image processor can be coupled to the input of the interface, for processing the rasterized image data prior to compression. Alternatively, the image processor can be coupled in the data output path after the decompressing means, for processing the rasterized image data on its way to the imaging device. In an illustrated embodiment, the image processor uses a convolutional filter to enlarge objects within the image.

It is also possible that the imaging device will be capable of scanning documents to digitize them for input to another device. In this case, the digital image data from the imaging device can be received by the interface of the present invention for storage in an input queue. Means can be provided in the interface for compressing the image data received back from the imaging device for storage in the input queue in a compressed form.

BRIEF DESCRIPTION OF THE DRAWINGS

FIG. 6 is a diagram illustrating a two color image for output from an imaging device;

FIG. 7 is a diagram illustrating the two different objects which form the image of FIG. 6;

FIG. 8 is a diagram illustrating an image resulting from a misregistration in the imaging device; and FIG. 9 is a diagram illustrating how the misregistered image of FIG. 8 can be corrected by enlarging one of the image objects in accordance with the present invention.

DETAILED DESCRIPTION OF THE INVENTION

Figure 1:
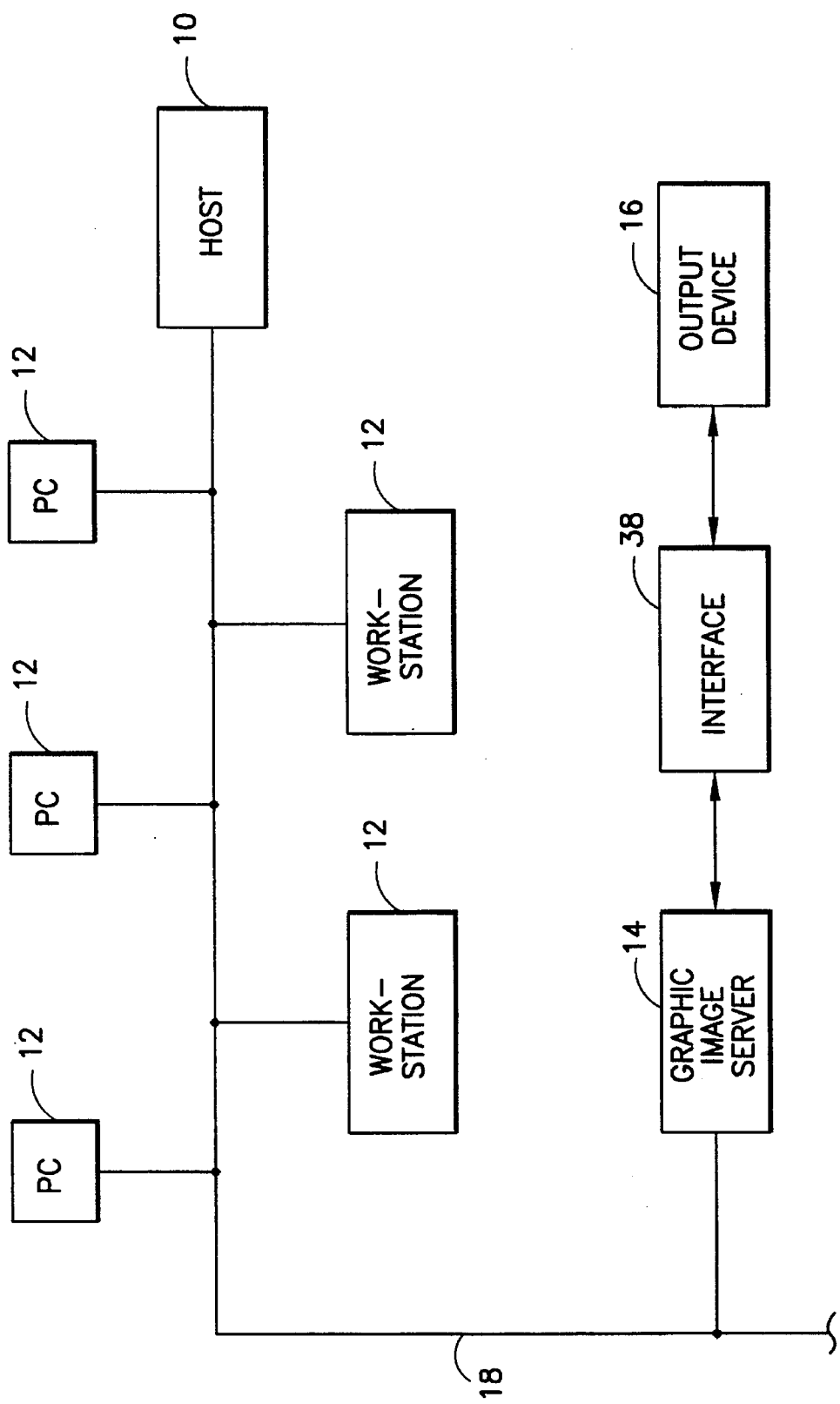
FIG. 1 is a diagrammatic illustration of a network including a host computer, a plurality of workstations, a graphic image server, and an output device coupled via an interface in accordance with the present invention.

FIG. 1 illustrates a computer network including a host computer 10 and a plurality of personal computers (e.g., PC or Macintosh) and/or workstations 12, each of which may communicate with the host computer 10 and with a graphic image server 14 via network path 18. One or more output devices 16, such as a color copier, laser printer or photographic image recorder are coupled via an interface 38 to graphic image server 14 for the generation of paper copies, transparencies, slides or the like. Other types of output devices that can be coupled to the network include display monitors and non-photographic (e.g., thermal dye transfer) image recorders.

A user creates a graphic image file that includes one or more graphic images, using a personal computer or workstation 12 that runs commercially available graphics software. The graphic image file in, e.g., text or bitmap format, may then be communicated to (or already stored on) the graphic image server 14 via network path 18. It will be appreciated that the graphic image files may, rather than being transferred along network 18, be temporarily stored on a medium such as a diskette and then input to the graphic image server 14 via a floppy disk drive or the like. After receiving the graphic image file, the graphic image server processes the data for each of the individual images contained in the file into raster image data for transfer to the output device 16 via interface 38. The output device then scans the raster image data directly onto photographic film or the like to produce color or black and white slides or onto a photoreceptive drum for transfer to an output substrate such as paper or transparency film.

The graphic image files created by different users may be in any of several conventional formats. Examples of such formats are PostScript files, TIFF files and Targa files. PostScript, for example, is a device-independent page description language optimized to render document images on display devices, laser printers, film recorders, fax machines and phototypesetters. In PostScript, a page is represented as a bit map, with one bit per pixel. When an actual page is printed, each pixel corresponding to a "1" bit is printed in black (or a predefined color) and each pixel corresponding to a "0" bit is left blank. PostScript is typically used for line art, with or without photographic images. TIFF files comprise a tagged image file format bitmap and are well suited to photographic images. Targa files are also bit mapped files particularly well suited to photographic imaging.

Figure 2:
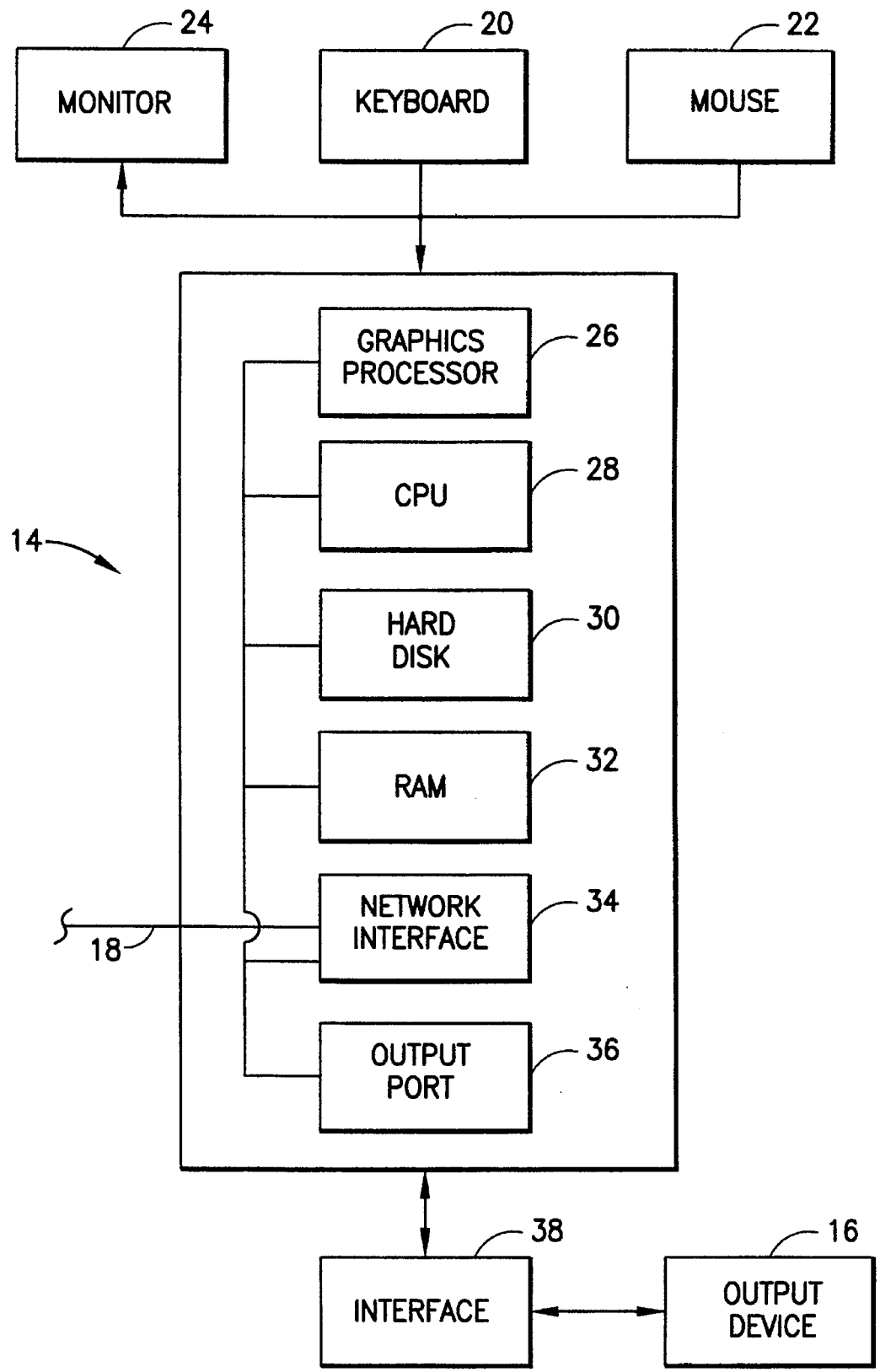
FIG. 2 is a block diagram of a workstation embodying a graphic image server and interface in accordance with the present invention.

FIG. 2 depicts the hardware components of one embodiment of a graphic image server 14 in accordance with the present invention. The image server can be implemented in a graphics workstation, such as one commercially available from Silicon Graphics Incorporated. Well known user interfaces are provided and include a keyboard 20 and a mouse 22. A graphic display monitor 24 is also provided to interface with a user and can be configured as a separate output device for viewing rasterized images generated by the graphic image server.

Graphics capability is provided in the workstation by a graphics processor 26. One or more central processing unit(s) (CPU) 28 provides intelligence for the workstation. Software, including raster image processing software (e.g., PostScript, TIFF and Targa) and "job controller software" in accordance with the present invention is stored, e.g., on a hard disk 30 or can be transferred from host computer 10. Random access memory (RAM) 32 is provided for use by the workstation and is also used for various queues, including an output queue in accordance with the invention. A network interface 34, such as a conventional Ethernet interface, allows the workstation to communicate with other components coupled to network path 18. Output port 36, which can be, for example, a standard Centronics parallel port, couples the workstation to output device 16 (e.g., a color copier, laser printer, image recorder, or the like) via an interface 38 that may include, for example, a universal asynchronous receiver transmitter (UART) port or an external small computer standard interface (SCSI).

Figure 3:
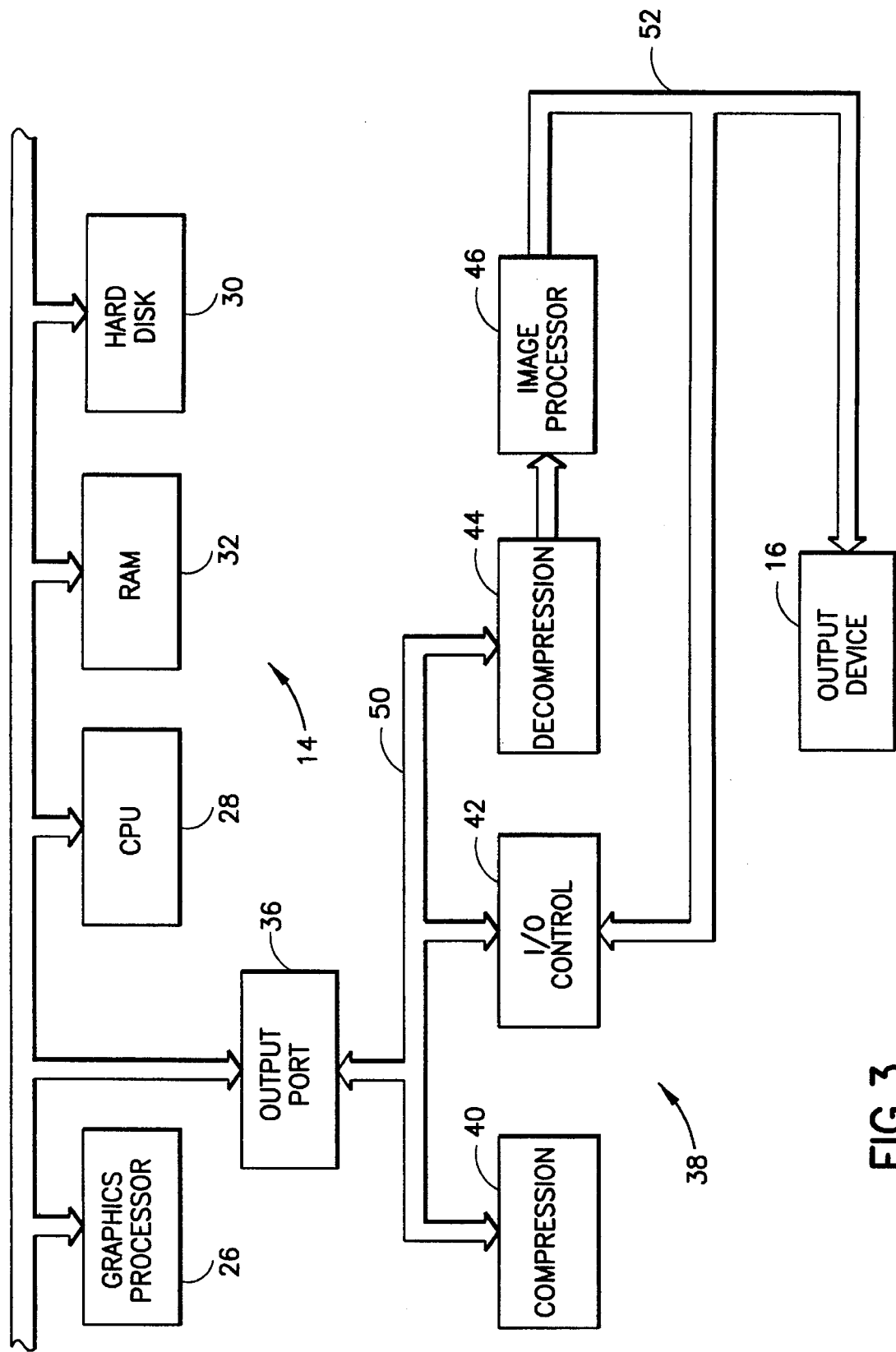
FIG. 3 is a block diagram illustrating the interface 38 of FIG. 2 in greater detail.

FIG. 3 is a more detailed block diagram of interface 38, and illustrates the data flow between the interface and various other components of graphic image server 14. Interface 38 includes a compression subsystem 40, an input/output (I/O) control function 42, a decompression subsystem 44 and an image processor 46. A primary data bus 50 couples the compression and decompression subsystems as well as the I/O control to the components of graphic image server 14 via output port 36. In particular, the various components of interface 38 that are coupled to the bidirectional primary data bus 50 can communicate with graphics processor 26, CPU 28, RAM 32 and hard disk 30 of graphic image server 14 on an as needed basis. Bidirectional output data bus 52 enables the rasterized image data from interface 38 to be communicated to output device 16. Output data bus 52 also enables the output device 16 to communicate with the interface and ultimately with the graphic image server 14 via I/O control 42.

In order to conserve memory resources in accordance with the present invention, rasterized image data is compressed prior to storage in RAM 32 or on hard disk 30. This compression can be provided by compression processor 40 on the interface board or, alternatively, the graphics processor 26 can compress the image data as part of the rasterization process.

The data is not decompressed until it is ready to be output to output device 16. In order to accomplish this, interface 38 includes compression and decompression subsystems 40, 44. In the illustrated embodiment, after the graphics processor 26 has rasterized image data, the rasterized data is transferred to the interface 38 where it is compressed by compression subsystem 40. The compression can be accomplished using any known, preferably lossless compression scheme. An example of such a scheme is run length coding. In run length coding, each scan line of the rasterized data is coded based on the number of consecutive pixels having the same color. As noted above, the compression can alternatively be performed by the RIP which runs in graphics processor 26. In this case, there is no need to provide compression processor 40 in the interface. The same run code (or other compression) technology would be embedded in the RIP.

Figure 4:
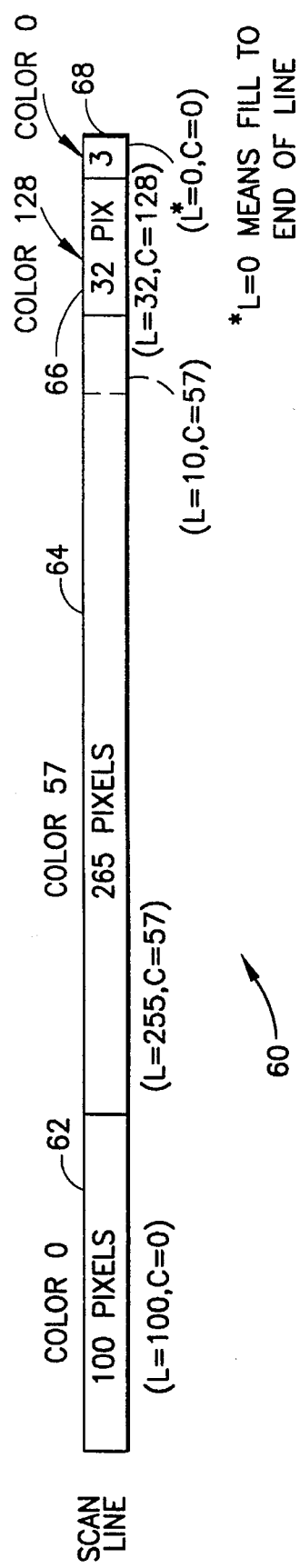
FIG. 4 is a diagrammatic illustration of a rasterized image scan line showing how the pixel information can be run length coded (RLC) in accordance with the present invention.

Each scan line is composed of a sequence of pixels defining the color(s) represented by that line. Thus, for example, scan line 60 illustrated in FIG. 4 is four hundred pixels wide, and includes one hundred consecutive pixels 62 of "color 0," two-hundred sixty-five consecutive pixels 64 of "color 57," thirty-two consecutive pixels 66 of "color 128," and three consecutive pixels 68 of "color 0." Instead of storing all four hundred pixels for scan line 60, the line can be run length coded so that substantially less data is necessary to represent the entire line. In the example illustrated, the run length coding maintains a record of how many consecutive pixels are provided for each color represented in the line. Thus, the run length code for the scan length illustrated in FIG. 4 can comprise (L=100, C=0), (L=255, C=57), (L=10, C=57), (L=32, C=128), (L=0, C=0). In this representation, L is the number of consecutively colored pixels and C is the color for that "run" of pixels. Each of L and C can be represented by an eight bit word. Since eight bits only define 256 possible values, it should be noted that the two-hundred sixty-five pixel run (reference no. 64) of color 57 is represented in the run length code as a first run of length two-hundred fifty-five and a second run of length ten. It should also be noted that the final run of consecutive same color pixels in each scan line is represented by the code L=0, which means that the scan line is filled to its end with the color represented by the final run length code for the line. It will be appreciated that other byte sizes and coding criteria could easily be substituted for the examples discussed above.

After the rasterized image data for an image has been compressed by compression subsystem 40, it is sent back via output port 36 to RAM 32 or hard disk 30 until it is needed for output to the output device 16. The addressing of RAM 32 or hard disk 30 in order to store the compressed data is carried out under the control of CPU 28 in a conventional manner. In a preferred embodiment, the compressed data is stored in RAM 32 which is configured as an output queue. When an image is ready to be processed by output device 16, the corresponding compressed, rasterized image data are retrieved from RAM 32, decompressed by the decompression subsystem 44 of interface 38 and forwarded to the output device either directly or via optional image processor 46. The decompression subsystem 44 applies the inverse run length code (or the inverse of any other compression) that was applied by compression subsystem 40. In accordance with the present invention, the decompression is done "on the fly" as the rasterized image data is on its way to output device 16.

By providing compression and decompression in the interface, the output queue (e.g., RAM 32) is bracketed by compression. The rasterized image data is only stored by the graphic image server in compressed form, substantially reducing the memory requirements for the output queue. Using a compression scheme such as run length coding, compression on the order of 100:1 can be achieved, although lower compression ratios are more typical. Even with lower compression ratios, the amount of RAM or hard disk space required can be significantly reduced. Once the compressed data is output from RAM 32 to interface 38, it is immediately decompressed for further output to the output device. In this manner, the benefits of compression are achieved completely independently of the output device. There is no need to require the output device to have a decompression stage, and no need to accommodate any particular decompression requirements that might otherwise be mandated by the output device.

The interface of the present invention can additionally provide bidirectional compression. For example, if output device 16 (FIG. 3) is a copier, it may have the capability of scanning a document and outputting digitized image data. This image data can be communicated via bus 52 and I/O control 42 back to compression processor 40. The compression processor will process the scanned image data in accordance with a known compression scheme, such as run length coding. The compressed data will then be communicated via output port 36 (functioning as a bidirectional port) to RAM 32 or hard disk 30, which stores the compressed data in an appropriate input queue for subsequent output to another device such as graphics processor 26.

I/O control 42 can comprise a microprocessor that controls the flow of data between the various components of the interface 38. It will be understood that control lines (not shown) interconnect I/O control 42 with the various other components of the interface. Also not illustrated are conventional power supply lines.

I/O control 42 also enables page oriented output devices (e.g., color copier print engines) to be driven at their maximum rated speed. As indicated above, most mechanical print engines have a first copy out delay period during which various mechanical parts are brought up to speed and prepared for producing images. In accordance with the present invention, I/O control 42 enables different successive images output from the interface to be processed by such print engines in a continuous run without returning to an idle state between each different image. This is accomplished by taking advantage of the fact that such print engines are able to make multiple copies of the same image.

Such print engines, typically found in copiers and laser printers, allow an operator to specify a number of copies to be made. For example, where copies are made by placing an original document on a platen, the operator can specify that he wants, e.g., one hundred copies of that document. The copier will then proceed to make continuous copies of the same document until the desired number of copies has been provided.

Taking advantage of this multiple copy feature, the I/O control 42 of the present invention will instruct the output device 16 to make the maximum number of multiple copies that the output device is capable of making, when the first image is forwarded to the output device for reproduction on a substrate. The output device will then continue to run at its maximum rated speed, with the interface providing a new set of rasterized image data for each subsequent copy made. The output device proceeds on the assumption that it is making multiple copies of the same image, even though it may actually be making a single copy of each of the different images forwarded thereto by the interface 38.

Unfortunately, the interface may not know in advance the exact number of images it will be sending to the output device. For example, if a document is described in a language-like PostScript, then the total number of pages will not be known until the document is completely processed. It would be far more convenient to print the document page by page, rather than having to completely process it before beginning to print it. Another situation that can create difficulty is where one or more pages of a multi page document carries a particularly complex image. Ideally, the graphic file server should be able to produce the pages as fast as the output device requires them. If a complex page causes the graphic file server to slow down and be late, the output device may produce an extraneous page if it is merely set to make continuous copies. Since neither the graphic file server nor the interface know the number of pages that are going to be sent to the output device in advance, and cannot predict when a page will be late due to processing complexity, it is impossible to simply send the output device a reliable count of the number of pages to be produced.

In order to overcome this problem, I/O control 42 provides an "abort" command to the output device. As indicated above, the I/O control initially instructs the output device to produce a large number of consecutive copies, e.g., the maximum number of continuous copies that it is capable of producing. The interface 38 will then begin sending raster image data for each successive page to be produced. In the event that the interface runs out of output images to send before the copy count to which the output device has been set is reached, an abort command is sent by the I/O control 42 to the output device. Another copy count and start command would be sent to the output device when additional images are available from the graphic image server.

The specific implementation of the abort command must account for any inability of the output device to stop immediately. For example, due to mechanical constraints the output device may have already started a new substrate (e.g., piece of paper) in motion by the time the I/O control sends the abort command. This would produce an undesirable blank page at the end of the run. Thus, for such an output device it would be necessary to send the abort command one or even two pages in advance of the point at which the last page of rasterized image data is forwarded via output data bus 52. In order to accomplish this, provision is made by I/O control 42 for synchronization of the timing of the abort command with the mechanical cycle of the output device. It should be appreciated that the specific timing of the abort command will generally be different for each different type of output device.

Figure 5:
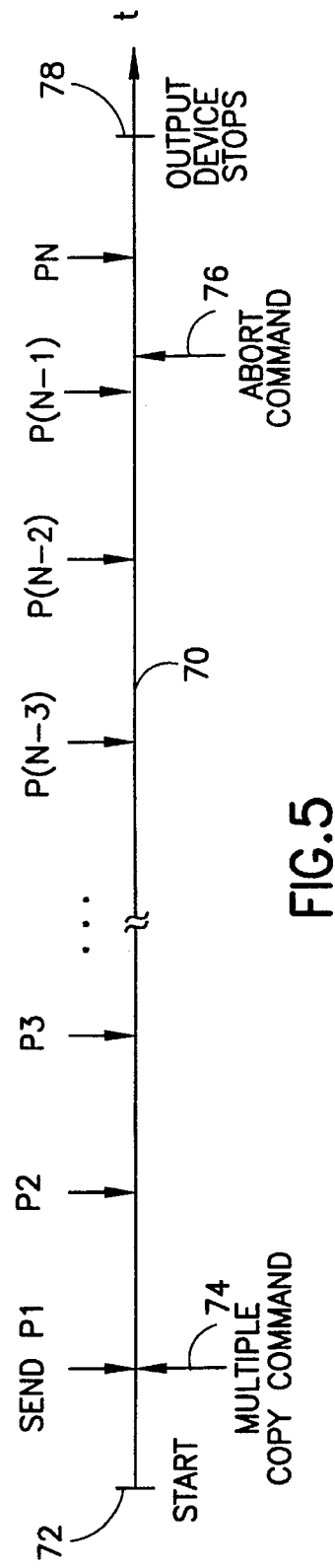
FIG. 5 is a time line illustrating the issuance of a multiple copy command and abort command in accordance with the present invention.

An example of the abort command timing is illustrated by time line 70 in FIG. 5. The production of images by the output device 16 commences at point 72 when I/O control 42 sends a start command to the output device via bus 52. Thereafter, at a point designated by reference numeral 74, the I/O control sends the output device 16 a multiple copy command, instructing the output device to commence a continuous run of a large number of copies. At the same time, the decompressed rasterized image data for a first page P1 is forwarded from decompression subsystem 44 to the output device 16 via data bus 52. Rasterized image data for subsequent pages (P2, P3, . . . PN) are consecutively sent to the output device from the decompression subsystem 44 (or, in the case compression and decompression is not used, directly from output port 36) for processing by the output device 16. An abort command is sent when the output queue (RAM 32) has been depleted to less than two pages of new images.

In the example set forth in FIG. 5, the abort command occurs at time 76, which is after the rasterized image data for page P(N–1) has been sent but before the data for page PN has been sent. This will cause the output device to stop preparing additional substrates for imaging. In the case of a color copier, the result of the abort command will be to stop the copier from feeding a new sheet of paper into the print engine. By the time the abort command has been received, the sheet of paper necessary for page PN will have already been retrieved from the paper supply bin, due to the previous continuous running of the copier established by the multiple copy command sent at time 74. After the last page PN has been printed, the output device will stop at time 78.

It should be appreciated that the timing of the abort command illustrated in FIG. 5 is only an example. Those skilled in the art will appreciate that the specific timing of the abort command will depend on the mechanics of the particular output device involved. Some copiers, for example, may have two or more sheets of paper in process at one time. In the case where more than two sheets of paper are in process at one time, the abort command will have to be sent sooner. In particular, the abort command will be sent as soon as the sheet paper that will ultimately carry page PN has been retrieved from the input paper tray. The abort command will negate the previously sent multiple copy command, and cause the output device to stop retrieving new paper without stopping the device from finishing the imaging of the sheets it has already retrieved. High speed color copiers currently on the market are provided with a connector to enable the external control of features such as initiating multiple copies and terminating multiple copies. Such a connector is provided, for example, on the model 5775 color copier marketed by Xerox Corporation of Rochester, N.Y. Thus, the interface 38 of the present invention can be directly coupled to such a copier via the connector provided by the copier manufacturer.

Optional image processor 46, illustrated in FIG. 3, is coupled to receive the rasterized image data prior to communication to the output device 16. The image processor selectively enlarges objects contained in images represented by the rasterized image data to compensate for potential multi-pass misregistration errors in the output device. Although the image processor is located after decompression subsystem 44 in FIG. 3, it can alternatively be located prior to the compression subsystem 40. In either case, the image processor will process the uncompressed (or decompressed) rasterized image data provided by graphics processor 26 or by the output queue (e.g., RAM 32) via the graphic image server output port 36.

An illustration of the potential multi-pass misregistration is illustrated in FIGS. 6–8. The correction of the misregistration problem in accordance with the present invention is illustrated in FIG. 9. FIG. 6 illustrates a desired color image generally designated 80. As shown in FIG. 7, the image includes a first portion 82 of color A and a second portion 84 of color B. A window 86 is located within portion 84 where portion 82 is supposed to reside. The desired image 80 is formed by at least two passes of the substrate (e.g., a sheet of paper) through the imaging device. On a first pass, color A will be printed. On a second pass, color B will be printed, or vice-versa.

If the color passes are not perfectly registered with respect to each other, a misregistered image will result. Thus, for example, as illustrated in FIG. 8 a misregistration of portion 82 on portion 84 will result in the appearance of a white border 86. In order to prevent the white border in the final output, image processor 46 slightly enlarges (i.e., "dilates") image portion 82, so that it overlaps the unwanted border 86. The enlarged perimeter of object 82 is illustrated in FIG. 9 by the dotted area 88 which overlaps boarder 86.

In order to selectively enlarge objects within an image, image processor 46 can use a convolutional filtering scheme. Various spacial smoothing techniques are well known in the image processing art. Such techniques are described, for example, in Duda, Richard O., *Pattern Classification and Scene Analysis,* John Wiley & Sons, Inc., pp. 267–276, 1973. The basic idea in spacial smoothing is to replace a pixel value at a point by the convolved value of the picture function in the immediate vicinity. Although such a convolution function may affect details, it will also slightly "enlarge" the object. It is this latter property that is advantageously used in accordance with the present invention.

The filtering function provided by image processor 46 in accordance with a preferred embodiment is provided by a technique known as logical dilation. This technique is based on the observation that picture elements appearing within a convolution window (e.g., a 3×3 block of pixels) can be treated as boolean or logical variables. The value of the picture function at a point can then be defined by any boolean function of these variables. In a preferred embodiment, the logical operator can be constructed such that a cell takes on an output value of "1" if it or any of its neighbors have an input value of "1." An example of a logical smoothing operator that satisfies this requirement is defined as follows:

For a 3×3 window of pixels defined as:

| a | b | c |
|---|---|---|
| d | e | f |
| g | h | i | e', the new picture value at the center cell of the window, is defined by $$e' = a \vee b \vee c \vee d \vee e \vee f \vee g \vee h \vee i$$

where "$a \vee b$" means "a or b".

This logical function has the desired properties for dilation, since the new e' is "1" if it or any of its neighbors are "1". It should be appreciated that this same concept is extensible to grey scale images with the use of maximum functions in place of OR functions.

In a black and white implementation of the above filtering algorithm, a pixel value of "1" means that the pixel is to be printed and a pixel value of "0" means that the pixel is not to be printed. Since the new picture value at the center cell of the window will be "1" (i.e., printed) if any of the other pixels in the cell are "1", a dilation of image objects to which the algorithm is applied will result. For color images, the same basic concept is used, except that the pixel values can range, e.g., from 0–255. In this case, adjacent pixels having the same value will cause the value of a pixel they surround to be changed. The number of pixels within the convolution window as well as the number of convolution passes can be varied to achieve the desired filtering.

It should be appreciated that other image processing algorithms could be used instead of the algorithm described above to achieve the same or other similarly useful purposes. The present invention takes advantage of the fact that such algorithms can be used to slightly dilate the size of image objects, in order to compensate for physical misregistrations of images formed from multiple passes without the need for any direct control over the imaging device (e.g., color copier or laser printer) itself.

It should now be appreciated that the present invention provides a unique interface for a digital imaging system. The interface provides rasterized data to an output device such as a color copier or laser printer. The rasterized data can be stored in a compressed form within the imaging system, and decompressed as it is output to the imaging device.

Maximum throughput of the imaging device is achieved by placing the device into a mode originally designed to output multiple copies of the same document, when in fact the device is fed data for a plurality of different image pages. Proper control of the imaging device in this mode is achieved by the novel use of an abort command.

The interface of the present invention also compensates for physical misregistrations in the imaging device caused by multiple imaging passes. The compensation is achieved without direct control over the print engine of the imaging device.

Although the invention has been described in connection with various specific embodiments thereof, those skilled in the art will appreciate that numerous adaptations and modifications may be made thereto without departing from the spirit and scope of the invention as set forth in the claims. For example, an interface in accordance with the invention can include any one of the various features described herein, or any combination thereof.

What is claimed:

1. An interface for providing rasterized data to an imaging device, said imaging device having the capability to operate in a multiple single copy mode for making multiple copies of a single image in response to a multiple copy command, comprising:

an input for receiving rasterized image data from a raster image processor, said rasterized image data being representative of a plurality of different images to be provided on separate substrates by said imaging device;

an output queue for holding the rasterized image data until said imaging device is ready to receive the data for processing;

a data output path coupled between said output queue and said imaging device for communicating said rasterized image data to said imaging device; and means for issuing control signals to said imaging device, said control signals including said multiple copy command instructing the imaging device to continue preparing additional substrates for imaging after a first substrate has been prepared for imaging;

wherein successive substrates prepared for imaging by said imaging device in response to said multiple copy command are imaged with said plurality of different images of said rasterized image data while said imaging device is in said multiple single copy mode.

2. An interface in accordance with claim 1, wherein:

said output queue holds said rasterized image data in a compressed form; and said data output path communicates said rasterized image data in an uncompressed form to said imaging device;

said interface further comprising:

means within said data output path for decompressing the compressed rasterized image data from said output queue as the data is being communicated to said imaging device.

3. An interface in accordance with claim 2 further comprising:

means for compressing the received rasterized image data to provide said compressed rasterized image data to said output queue.

4. An interface in accordance with claim 3 wherein said compression means use a lossless compression scheme to compress said rasterized image data.

5. An interface in accordance with claim 2 further comprising:

means for receiving image data back from said imaging device; and means for compressing the image data received back from said imaging device for storage in an input queue.

6. An interface in accordance with claim 3 further comprising:

means for receiving image data back from said imaging device;

wherein said compressing means also compress the image data received back from said imaging device for storage in an input queue.

7. An interface in accordance with claim 1 further comprising:

a dilating image processor coupled to receive said rasterized image data prior to said rasterized image data being communicated to said imaging device, said dilating image processor selectively dilating objects contained in images represented by said rasterized image data to compensate for potential multi-pass misregistration errors in the imaging device.

8. An interface in accordance with claim 7, wherein:

said output queue holds said rasterized image data in a compressed form; and said data output path communicates said rasterized image data in an uncompressed form to said imaging device;

said interface further comprising:

means within said data output path for decompressing the compressed rasterized image data from said output queue as the data is being communicated to said imaging device;

wherein said dilating image processor is coupled to process said rasterized image data prior to the compression thereof.

9. An interface in accordance with claim 7 wherein:

said output queue holds said rasterized image data in a compressed form; and said data output path communicates said rasterized image data in an uncompressed form to said imaging device;

said interface further comprising:

means within said data output path for decompressing the compressed rasterized image data from said output queue as the data is being communicated to said imaging device;

wherein said dilating image processor is coupled in said data output path after said decompressing means, for processing the rasterized image data on its way to said imaging device.

10. An interface in accordance with claim 7 wherein said dilating image processor is coupled to said input, for processing said rasterized image data prior to said output queue.

11. An interface in accordance with claim 7 wherein said dilating image processor is coupled in said data output path, for processing the rasterized image data on its way to said imaging device.

12. An interface in accordance with claim 7 wherein said dilating image processor uses a convolutional filter to achieve said selective dilation.

13. An interface in accordance with claim 8, further comprising:

means for compressing the received rasterized image data to provide said compressed rasterized image data to said output queue.

14. An interface in accordance with claim 13 wherein said compression means use a lossless compression scheme to compress said rasterized image data.

15. An interface in accordance with claim 1, wherein said control signals include an abort command instructing the imaging device to stop preparing said additional substrates for imaging before a number of substrates corresponding to said multiple copy command have been imaged by said imaging device.

16. An interface in accordance with claim 15 wherein said means for issuing control signals are responsive to said output queue for issuing said abort command when the level of compressed rasterized image data in said output queue has been depleted to a predetermined point.

17. An interface in accordance with claim 16, wherein said output queue is depleted to said predetermined point while a remainder of raster image data of said plurality of different images has not yet been imaged by said imaging device and has not been received by said input; and said control signal issuing means issues a new multiple copy command when said remainder of said raster image data is available for imaging to instruct the imaging device to prepare additional substrates for imaging said remainder of said raster data.

18. An interface in accordance with claim 16 wherein said predetermined point is when the output queue is empty.

19. An interface in accordance with claim 16 wherein said predetermined point is when the output queue has been depleted to the number of images for which the imaging device will continue to prepare additional substrates after receiving the abort command and before coming to rest.

20. An interface in accordance with claim 16 wherein said means for issuing control signals are also responsive to said imaging device for delaying the issuance of said abort command until the imaging device has commenced preparation of a final substrate necessary for an imaging job.

21. An interface in accordance with claim 1, wherein said imaging device images said plurality of different images without returning to an idle state.

22. An interface in accordance with claim 1, wherein said multiple copy command instructs the imaging device to prepare a number of substrates, $N_1$, which is greater than a number of substrates, $N_2$, required for imaging of said plurality of different images.

23. An interface in accordance with claim 22, wherein said number of substrates, $N_1$, is the maximum number of multiple copies that the imaging device is capable of making.

24. An interface in accordance with claim 23, wherein said plurality of different images are of different levels of complexity and require correspondingly different processing times by said raster image processor.

* * * * *